United States Patent
Kondo

(10) Patent No.: US 9,969,264 B2
(45) Date of Patent: May 15, 2018

(54) VEHICLE INSTRUMENT DEVICE

(71) Applicant: Yazaki Corporation, Minato-ku, Tokyo (JP)

(72) Inventor: Kazuaki Kondo, Shimada (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 248 days.

(21) Appl. No.: 14/734,776

(22) Filed: Jun. 9, 2015

(65) Prior Publication Data

US 2015/0266380 A1 Sep. 24, 2015

Related U.S. Application Data

(63) Continuation of application No. PCT/JP2013/083125, filed on Dec. 10, 2013.

(30) Foreign Application Priority Data

Dec. 10, 2012 (JP) ................................ 2012-269629

(51) Int. Cl.
*H04N 5/64* (2006.01)
*B60K 35/00* (2006.01)
*B60K 37/00* (2006.01)

(52) U.S. Cl.
CPC .............. *B60K 35/00* (2013.01); *B60K 37/00* (2013.01); *B60K 2350/1064* (2013.01)

(58) Field of Classification Search
CPC ................................ B60K 35/00; B60K 37/00
USPC ........................................................ 348/837
See application file for complete search history.

(56) References Cited

FOREIGN PATENT DOCUMENTS

| DE | 102005042863 | * | 3/2007 | ............. G04G 17/08 |
| DE | 102005042863 A1 | * | 3/2007 | ............. B60K 35/00 |
| JP | 2008-026117 A | | 2/2008 | |
| JP | 2010-181478 A | | 8/2010 | |
| JP | 2011-095117 A | | 5/2011 | |
| WO | WO 2012050573 A1 | * | 4/2012 | ............. B60K 35/00 |

OTHER PUBLICATIONS

Jul. 19, 2016—(JP) Notification of Reasons for Refusal—App 2012-269629, Eng Tran.
Jan. 14, 2014—(JP) International Search Report and Written Opinion—App PCT/JP2013/083125.
Jun. 16, 2015—(WO) Int'l Prelim. Report on Patentability—App PCT/JP2013/083125, Eng Tran.

\* cited by examiner

*Primary Examiner* — Hung Dang
*Assistant Examiner* — Girumsew Wendmagegn
(74) *Attorney, Agent, or Firm* — Banner & Witcoff, Ltd.

(57) ABSTRACT

A vehicle instrument device includes: a display device accommodated in the vehicle instrument device; a display control circuit board which controls an operation of the display device and which is attached to a rear surface of the display device; and an instrument control circuit board which controls display except for the display device and which is formed as a separate member from the display control circuit. The display device, which is integrated with the display control circuit board to serve as a display unit, is accommodated in the vehicle instrument device together with the instrument control circuit board.

7 Claims, 3 Drawing Sheets

VEHICLE INSTRUMENT DEVICE

CROSS REFERENCE TO RELATED APPLICATION(S)

This application is a continuation of PCT application No. PCT/JP2013/083125, which was filed on Dec. 10, 2013 based on Japanese Patent Application (No. 2012-269629) filed on Dec. 10, 2012, the contents of which are incorporated herein by reference.

BACKGROUND OF THE INVENTION

1. Field of the Invention

The present invention relates to a vehicle instrument device in which a pointer-type instrument and a display device are arranged alongside each other.

2. Description of the Related Art

FIG. 3 shows a vehicle instrument device described in JP-A-2010-181478 described below.

A vehicle instrument device 100 is a complex meter (combination meter) which is disposed on a dashboard of a vehicle, and has a structure in which a pointer-type instrument (not shown) such as a speedometer or a tachometer and a liquid crystal display device (display device) 120 are arranged alongside each other in a device housing 110.

A display accommodation space 111 is secured at the center portion of the device housing 110. The display accommodation space 111 is a space into which the liquid crystal display device 120 is incorporated. The liquid crystal display device 120 can operate in a multifunctional manner, and for example, can function as an odometer which indicates traveling distance, a fuel consumption meter, a gear position indicator, or the like.

The device housing 110 shown in FIG. 3 includes a speedometer disposition portion 112 in which the speedometer serving as the pointer-type instrument is disposed, and a tachometer disposition portion 113 in which the tachometer serving as the pointer-type instrument is disposed.

That is, the vehicle instrument device 100 shown in FIG. 3 has a design in which the pointer-type instrument is disposed on each of both sides of the liquid crystal display device 120.

In the vehicle instrument device of the related art, in most cases, an electronic circuit for controlling the operation of the liquid crystal display device and an electronic circuit for controlling the operation of the pointer-type instrument are formed on one common circuit board.

SUMMARY OF THE INVENTION

In an electronic circuit for controlling the operation of a display device such as a liquid crystal display device or an organic EL display device, in most cases, a circuit element having a high integration degree such as a CPU for processing image data is used. Accordingly, from the viewpoint of securing reliability with respect to noise proofing properties and achieving high-density packaging, for example, a multilayer board formed in four layers or more is required for the circuit board.

Meanwhile, in the case of an electronic circuit for controlling the operation of a pointer-type instrument, compared to the electronic circuit which controls the operation of the display device, the integration degree of the circuit element used is lower, and also in consideration of the noise proofing properties or the mountability thereof, the multilayer board formed in four layers or more is not required.

Accordingly, when the electronic circuit for controlling the operation of the display device and the electronic circuit for controlling the operation of the pointer-type instrument are formed on one common circuit board, from the viewpoint of satisfying the requirement with respect to the electronic circuit for the display device, the multilayer board formed in four layers or more is used for the circuit board. Therefore, the circuit board becomes excessive in quality with respect to the electronic circuit for the pointer-type instrument, and thus, an increase in the cost of the vehicle instrument device occurs.

Accordingly, an object of the present invention is to solve the above-described problems, and is to provide a vehicle instrument device capable of preventing excessive quality in the pointer control circuit board for controlling the operation of the pointer-type instrument and reducing the cost in the vehicle instrument device in which the pointer-type instrument and the display device are arranged alongside each other.

The above-described object of the present invention is achieved according to the following configurations.

(1) A vehicle instrument device including a pointer-type instrument and a display device which are arranged alongside each other, wherein a display control circuit board for controlling an operation of the display device is formed as a separate member from a pointer control circuit board for controlling an operation of the pointer-type instrument, has a dimension in a front view substantially the same as a dimension of the display device in a front view, and is attached to a rear surface of the display device, and wherein the display device, which is integrated with the display control circuit board to serve as a display unit, is arranged alongside of the pointer-type instrument.

(2) The vehicle instrument device according to (1), wherein the display control circuit board includes an external connector provided in an outer surface on an opposite side of the display device to allow a connection with an external circuit.

(3) The vehicle instrument device according to (2), wherein the external connector is connectable with, as the external circuit, a signal cable which transmits a signal required for the operation of the display unit and a power cable which supplies power.

(4) The vehicle instrument device according to any one of (1) to (3), wherein the display device is a liquid crystal display device, and wherein the display control circuit board is an LCD control circuit board.

According to the configuration of (1), the display control circuit board for controlling the operation of the display device is formed as a separate member from the pointer control circuit board for controlling the operation of the pointer-type instrument. Accordingly, even when a multilayer board formed in four layers or more, which is advantageous for securing reliability with respect to noise proofing properties and achieving high-density packaging, is used for the circuit board serving as the display control circuit board, an inexpensive circuit board formed in three layers or less can be used for the circuit board serving as the pointer control circuit board in which the noise proofing properties or the mountability are not required to be as strict as in the display control circuit board.

Therefore, it is possible to prevent excessive quality in the pointer control circuit board for controlling the operation of the pointer-type instrument which is arranged alongside of the display device, and to reduce the cost.

In addition, according to the configuration of (1), since the display device, which is integrated with the display control circuit board to serve as a display unit, is arranged alongside of the pointer-type instrument, the pointer control circuit board for controlling the operation of the pointer-type instrument can be singly designed as a simple circuit board which does not include the circuit for controlling the operation of the display device, and thus, it is possible to easily design the pointer control circuit board. Moreover, a common use of the display device is easily achieved.

According to the configuration of (2), the outer surface of the display control circuit board provided with the external connector is a surface which is exposed to the outside on the surface positioned on the side opposite to the display device. Accordingly, the external connector is provided in the state of being exposed to the outside, and it is possible to easily connect the external connector to the external circuit.

According to the configuration of (3), since the signal cable which transmits the signal required for the operation of the display unit and the power cable which supplies power are connectable to the external connector of the outer surface of the display control circuit board, it is possible to easily perform connection of each of the cables.

Hereinbefore, the present invention is described briefly. In addition, an aspect (hereinafter, referred to as an "embodiment") for embodying the present invention below is described with reference to the drawings, and thus, the present invention is more specific.

DETAILED DESCRIPTION OF THE EXEMPLARY EMBODIMENTS

Hereinafter, a preferred embodiment of a vehicle instrument device according to the present invention will be described in detail with reference to the drawings.

Figure 1:
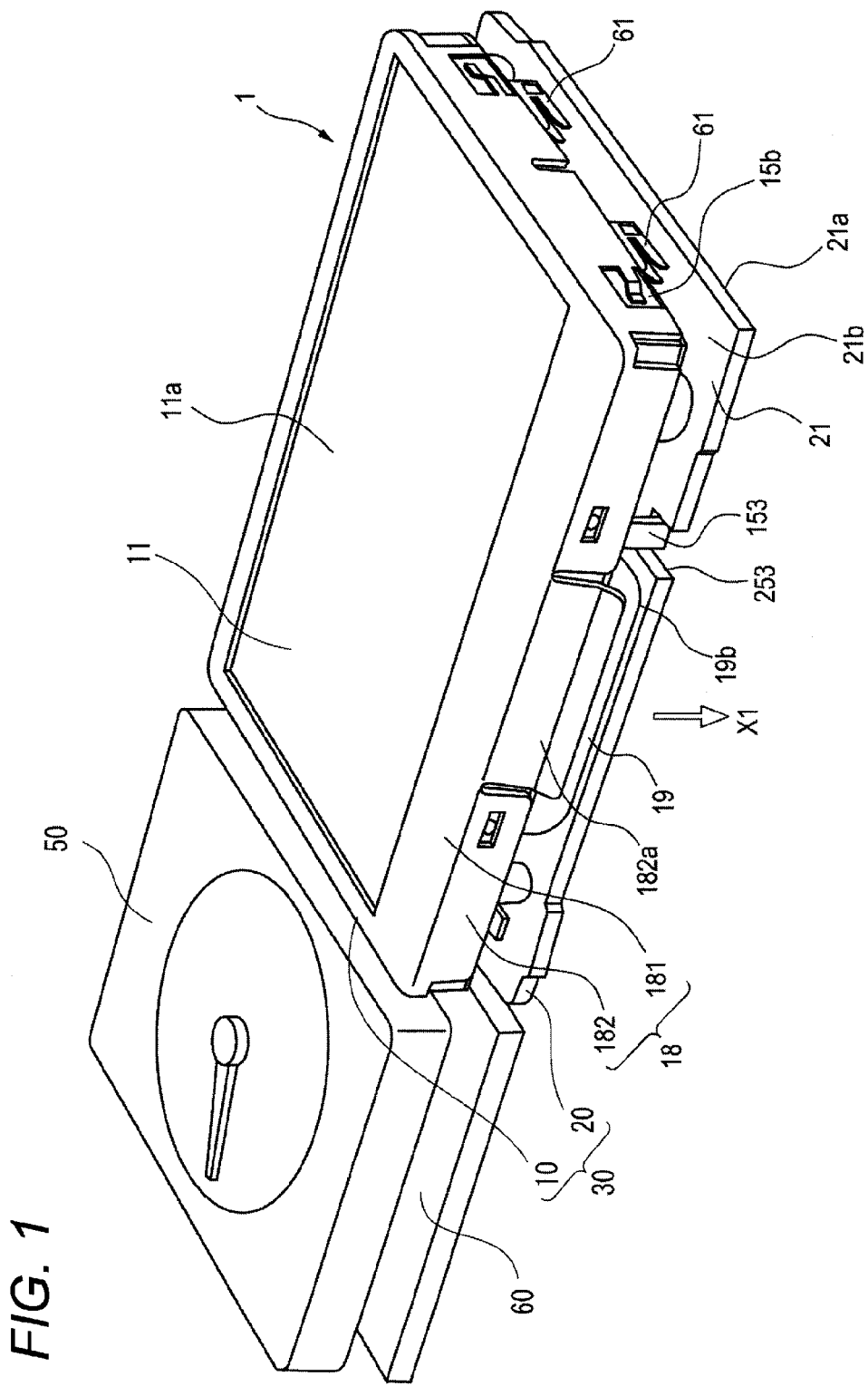
FIG. 1 is a perspective view of a display unit in an embodiment of a vehicle instrument device according to the present invention.
Figure 2:
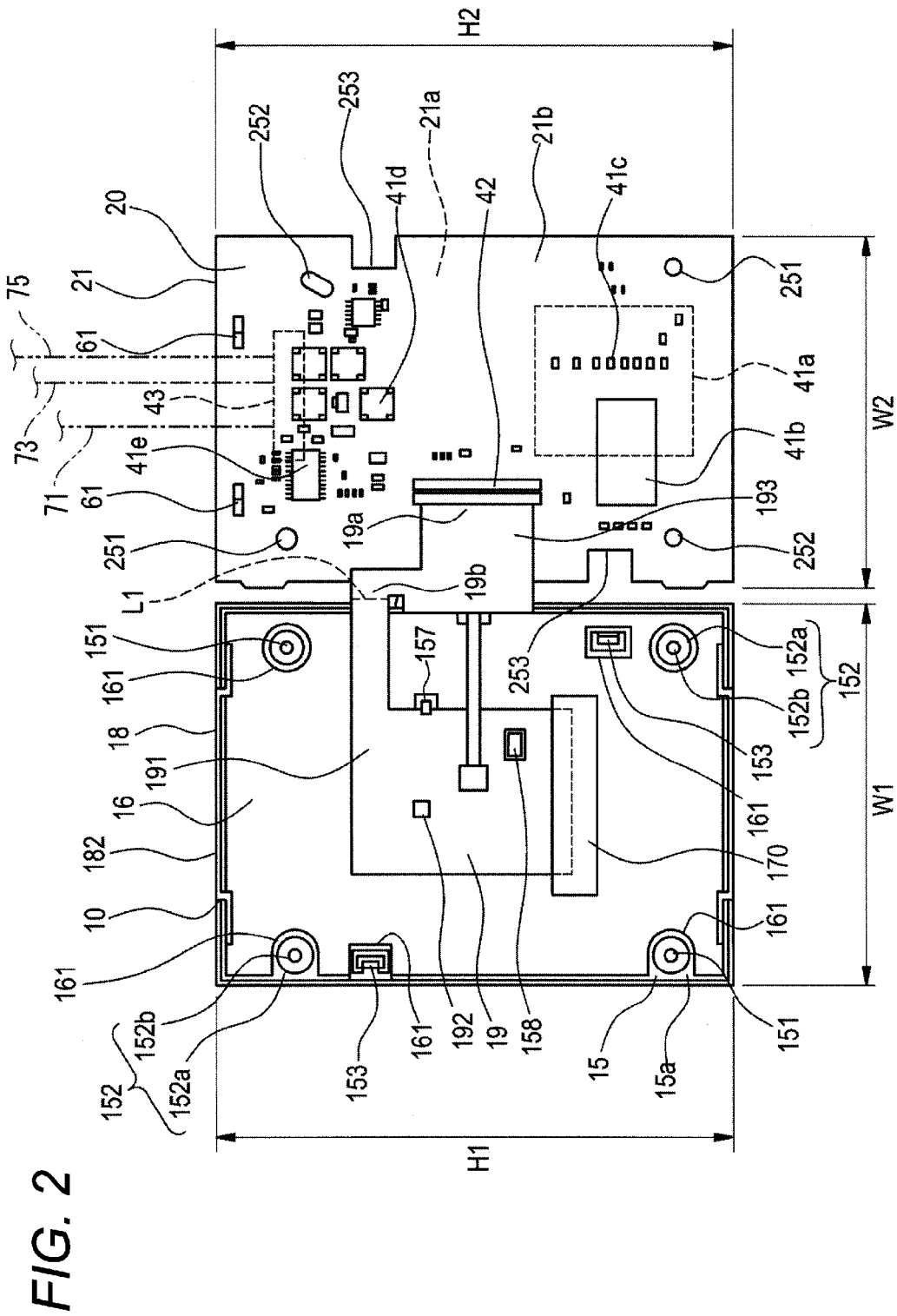
FIG. 2 is a development view of the display unit shown in FIG. 1.
Figure 3:
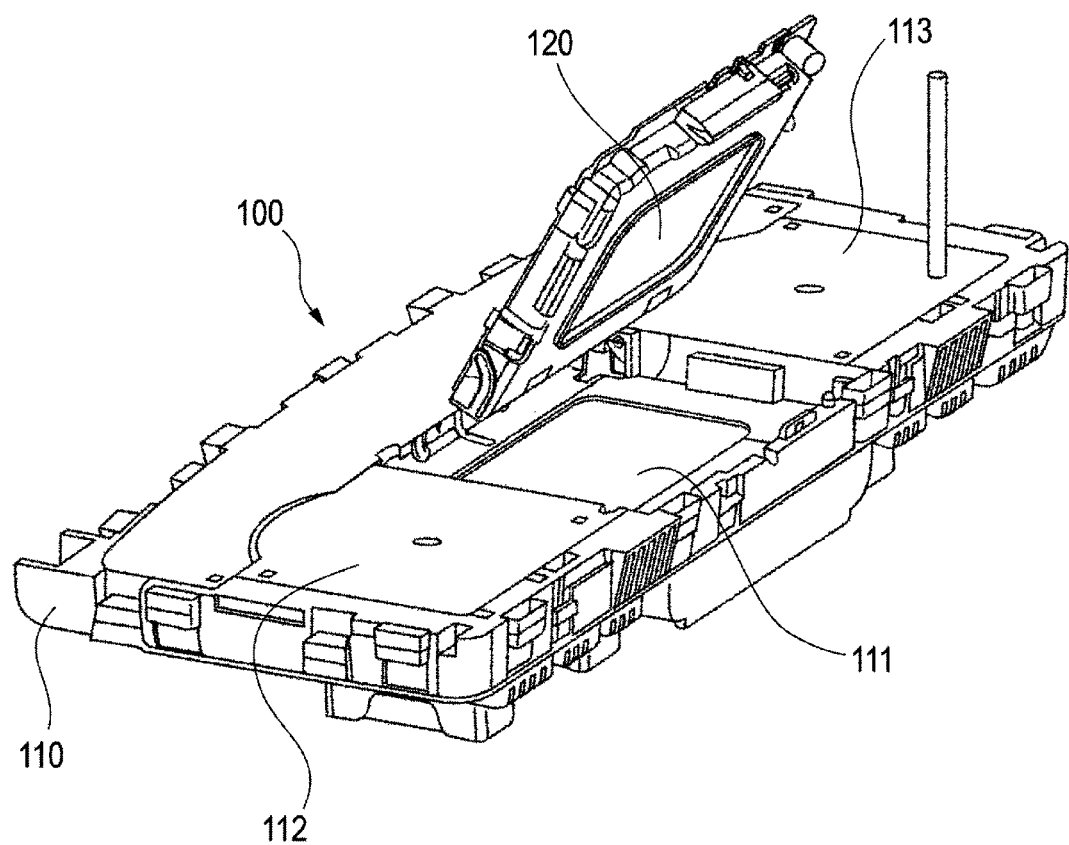
FIG. 3 is a perspective view of a vehicle instrument device of the related art.

FIG. 1 is a perspective view of a display unit in an embodiment of a vehicle instrument device according to the present invention, and FIG. 2 is a development view of the display unit shown in FIG. 1.

A vehicle instrument device 1 of the embodiment is a combination meter which is disposed on the dashboard of a vehicle, and a pointer-type instrument 50 and a liquid crystal display device (display device) 10 are arranged alongside each other in a device housing (not shown).

For example, the pointer-type instrument 50 includes a speedometer, a tachometer, or the like.

In the case of the present embodiment, an LCD control circuit board (display control circuit board) 20 is detachably attached to the rear surface of the liquid crystal display device 10 serving as the display device. The LCD control circuit board 20 is a substrate for controlling the operation of the liquid crystal display device 10, and is formed as a separate member from a pointer control circuit board 60 for controlling the operation of the pointer-type instrument 50. Moreover, in the case of the present embodiment, the liquid crystal display device 10, which is integrated with the LCD control circuit board 20 to serve as a liquid crystal display unit (display unit) 30, is arranged alongside of the pointer-type instrument 50.

Hereinafter, components of the liquid crystal display unit 30 according to the embodiment will be described in detail.

The liquid crystal display device 10 includes a liquid crystal display panel 11 having a display surface 11a on which an image is displayed, a box-shaped LCD case 15 which covers the rear surface side and the outer circumference of the liquid crystal display panel 11, a metallic bottom plate 16 which covers the rear surface of the LCD case 15, and a metallic bezel 18 which covers the periphery of the liquid crystal display panel 11.

Although it is not shown, a backlight which illuminates the liquid crystal is disposed on the rear surface of the liquid crystal display panel 11. The box-shaped LCD case 15 is made of a resin. The LCD case 15 includes a bottom wall portion 15a (refer to FIG. 2) which covers the rear surface of the liquid crystal display panel 11 from the outside of the backlight, and a side wall portion 15b (refer to FIG. 1) which covers the outer circumference of the liquid crystal display panel 11.

As shown in FIG. 2, the bottom plate 16 covers the bottom wall portion 15a of the LCD case 15.

Two mounting holes 151 for attaching the LCD control circuit board 20, two positioning pins 152, and two locking claws 153 are provided on the bottom wall portion 15a of the LCD case 15. The mounting holes 151, the positioning pins 152, and the locking claws 153 are exposed to the outside from notches 161 formed on the bottom plate 16.

Two mounting holes 151 are holes for screws for the LCD control circuit board 20, and female screws are formed on the mounting holes. The two mounting holes 151 are provided in the diagonal corners of one side on the rectangular bottom surface of the LCD case 15.

In each of the two positioning pins 152, a small-diameter pin main body 152b protrudes at the center of a large-diameter boss portion 152a, and the two positioning pins 152 are provided in the diagonal corners of the other side on the rectangular bottom surface of the LCD case 15. In each of the positioning pins 152, the pin main body 152b is inserted into a positioning hole 252 which is formed so as to penetrate the LCD control circuit board 20, and thus, the LCD control circuit board 20 is positioned.

When the LCD control circuit board 20 is positioned on the rear surface of the liquid crystal display device 10 by the two positioning pins 152, the two locking claws 153 are engaged with edges of the LCD control circuit board 20, and thus, the LCD control circuit board 20 is temporarily locked.

A Flexible Printed Circuit (FPC) 19 for electrically connecting the liquid crystal display device 10 and the LCD control circuit board 20 is drawn out at the center of the bottom plate 16. The FPC 19 is led out from the liquid crystal display device 10, and a tip 19a of the FPC is connected to the LCD control circuit board 20 by an FPC connector 42.

A portion 191 provided on the bottom plate 16 of the FPC 19 is fixed to the bottom plate 16 in a surface contact state by an adhesive attachment tape 170 and a pressing claw 157. In the case of the embodiment, an electronic component 192 is mounted on the portion 191 which is provided on the bottom plate 16 of the FPC 19.

The tip 19a of the FPC 19 extends outside the bottom plate 16, and as shown in FIG. 2, is connected to the FPC connector 42 on the LCD control circuit board 20 which is laid in a planer shape so as to be adjacent to the liquid crystal display device 10. When the LCD control circuit board 20 is attached to the rear surface of the liquid crystal display device 10, a portion 193 of the FPC 19 which extends outside the bottom plate 16 is folded onto the portion 191 provided on the bottom plate 16 of the FPC 19 at the position of a dotted line L1 shown in FIG. 2. That is, in the state where the portion 193 of the FPC 19 extending outside the bottom plate 16 overlaps with the portion 191 provided on the bottom plate 16 of the FPC 19, the portion 193 is accommodated between the liquid crystal display device 10 and the LCD control circuit board 20.

The bezel 18 is a metallic press-molded product, and as shown in FIG. 1, includes a front edge frame portion 181 which is located on the edges of the periphery of the display surface 11a of the liquid crystal display panel 11, and an outer circumferential frame portion 182 which covers the outside of the side wall portion 15b of the LCD case 15.

As shown in FIG. 1, an FPC cover portion 182a is provided at the position opposite to a folding portion 19b of the FPC 19 in the outer circumferential frame portion 182 of the bezel 18. In order to cover the outside of the folding portion 19b of the FPC 19, the FPC cover portion 182a is formed to be longer in the thickness direction (arrow X1 side in FIG. 1) of the liquid crystal display device 10 than the peripheral outer circumferential frame portion 182.

As shown in FIG. 2, the LCD control circuit board 20 includes various electronic components 41a, 41b, 41c, 41d, and 41e for controlling the operation of the liquid crystal display device 10, the FPC connector 42, and the external connector 43 which are mounted on a multilayer board 21 formed in four layers or more.

In the case of the present embodiment, the LCD control circuit board 20 has the dimension in a front view is substantially the same as the dimension of the liquid crystal display device 10 in a front view. That is, in FIG. 2, a width dimension W1 of the liquid crystal display device 10 and a width dimension W2 of the LCD control circuit board 20 are substantially the same as each other. Moreover, in FIG. 2, a length dimension H1 of the liquid crystal display device 10 and a length dimension H2 of the LCD control circuit board 20 are substantially the same as each other.

Among various electronic components 41a, 41b, 41c, 41d, and 41e mounted on the multilayer board 21, the electronic component 41a is a Central Processing Unit (CPU), and is mounted on an outer surface 21a of the multilayer board 21 which is positioned on the side opposite to the liquid crystal display device 10. The electronic component 41b is a Liquid Crystal Display (LCD) drive, and is mounted on an inner surface 21b of the multilayer board 21 which is disposed on the liquid crystal display device 10 side.

The FPC connector 42 mounted on the multilayer board 21 is a connector to which the tip 19a of the FPC 19 which is lead out to the rear surface of the liquid crystal display device 10 is connected. The FPC connector 42 is mounted on the inner surface 21b of the multilayer board 21.

The LCD control circuit board 20 is attached to the rear surface of the liquid crystal display device 10 so that the inner surface 21b of the multilayer board 21 opposes the rear surface of the liquid crystal display device 10.

A regulation rib 158 protrudes at the position opposing the FPC connector 42 on the LCD control circuit board 20 on the rear surface of the liquid crystal display device 10. The regulation rib 158 is integrally formed with the bottom wall portion 15a of the LCD case 15. When the connection of the tip 19a of the FPC 19 to the FPC connector 42 is incomplete, the regulation rib 158 interferes with the FPC connector 42 when the LCD control circuit board 20 is attached to the rear surface of the liquid crystal display device 10, causes the assembly of the LCD control circuit board 20 to be disabled, and detects connection failure.

The external connector 43 mounted on the multilayer board 21 is a connector used for a connection with the external circuit. The external connector 43 is mounted on the outer surface 21a of the multilayer board 21. In addition, a signal cable 71 which transmits signals required for the operation of the liquid crystal display unit 30, a power cable 73 which supplies power, and a GND cable 75 are connected to the external connector 43, as external circuits.

In order to fix the multilayer board 21 to the rear surface of the liquid crystal display device 10, two mounting holes 251, two positioning holes 252, and two locking notches 253 are provided on the multilayer board 21.

Two mounting holes 251 are holes corresponding to the mounting holes 151 on the rear surface of the liquid crystal display device 10, and male screws screwed to the mounting holes 151 can be inserted into the mounting holes 251.

Two positioning holes 252 are holes corresponding to the positioning pins 152 on the rear surface of the liquid crystal display device 10. The pin main bodies 152b of the positioning pins 152 are inserted into the two positioning holes 252, and thus, the two positioning holes 252 are positioned.

The two locking notches 253 are portions with which the locking claws 153 on the rear surface of the liquid crystal display device 10 engage.

In addition, in the case of the present embodiment, ground terminals 61 are provided on the inner surface 21b of the multilayer board 21. Each of the ground terminals 61 is made of metal, and the base end thereof is soldered to a grounding pattern (GND pattern) on the multilayer board 21. When the LCD control circuit board 20 is attached to the liquid crystal display device 10, each of the ground terminals 61 includes an LCD grounding portion which comes into elastic contact with the bottom plate 16 of the metallic bezel 18.

In the ground terminals 61 of the present embodiment, when the LCD control circuit board 20 is attached to the liquid crystal display device 10, a housing contact portion comes into elastic contact with the bottom plate 16, and thus, the bottom plate 16 and the GND pattern 23 are brought into a conductive state.

In the case of the present embodiment, the GND pattern on the multilayer board 21 to which the ground terminals 61 are soldered is connected to the outside GND cable via the external connector 43. In order to decrease the provided length of the GND pattern as much as possible, in the present embodiment, the GND pattern is provided at a position close to the external connector 43.

The operation in which the LCD control circuit board 20 is attached to the rear surface of the liquid crystal display device 10 is performed according to the following procedure.

First, as shown in FIG. 2, the rear surface of the liquid crystal display device 10 and the LCD control circuit board 20 are laid in a planar shape, and the tip 19a of the FPC 19 is connected to the FPC connector 42 of the inner surface 21b of the LCD control circuit board 20.

Subsequently, the FPC 19 is folded at the position of the dotted line L1 of FIG. 2, and the inner surface 21b of the LCD control circuit board 20 overlaps with the rear surface of the liquid crystal display device 10. In this case, the positioning pins 152 of the liquid crystal display device 10 and the positioning holes 252 of the LCD control circuit board 20 are positioned, and as shown in FIG. 1, the locking claws 153 of the liquid crystal display device 10 engage with the locking notches 253 of the LCD control circuit board 20, and thus, the LCD control circuit board 20 is temporarily locked to the rear surface of the liquid crystal display device 10.

Subsequently, the male screws which are inserted into the mounting holes 251 of the LCD control circuit board 20 are screwed into the mounting holes 151 of the liquid crystal display device 10, and thus, the LCD control circuit board 20 is fixed to the rear surface of the liquid crystal display device 10, and the assembly of the liquid crystal display unit 30 is completed.

For example, the above-described liquid crystal display unit 30 can function as an odometer indicating the traveling distance, a fuel consumption meter, a gear position indicator, or the like.

In the vehicle instrument device 1 of the present embodiment described above, the LCD control circuit board 20 for controlling the operation of the liquid crystal display device 10 is formed as a separate member from the pointer control circuit board 60 for controlling the operation of the pointer-type instrument 50. Accordingly, even when the multilayer board formed in four layers or more, which is advantageous for securing reliability with respect to noise proofing properties and achieving high-density packaging, is used for the circuit board serving as the LCD control circuit board 20, an inexpensive circuit board formed in three layers or less can be used for the circuit board serving as the pointer control circuit board 60 in which the noise proofing properties or the mountability is not required to be as strict as in the LCD control circuit board 20.

Therefore, it is possible to prevent excessive quality in the pointer control circuit board 60 for controlling the operation of the pointer-type instrument 50 which is arranged alongside of the liquid crystal display device 10, and to reduce the cost.

In addition, in the vehicle instrument device 1 of the present embodiment, since the liquid crystal display device 10, which is integrated with the LCD control circuit board 20 to serve as the liquid crystal display unit 30, is arranged alongside of the pointer-type instrument 50, the pointer control circuit board 60 for controlling the operation of the pointer-type instrument 50 can be singly designed as a simple circuit board which does not include the circuit for controlling the operation of the liquid crystal display device 10, and thus, it is possible to easily design the pointer control circuit board 60. Moreover, a common use of the liquid crystal display device 10 is easily achieved.

Moreover, the dimension of the LCD control circuit board 20 in the front view is substantially the same as the dimension of the liquid crystal display device 10 in the front view, the liquid crystal display unit 30 can have the minimum dimension in the front view, assembly performance (space property) with respect to the vehicle instrument device 1 is improved, and it is possible to secure the maximum mounting area for the electronic component within the dimension.

Moreover, in the vehicle instrument device 1 of the present embodiment, the outer surface (the outer surface 21a of the multilayer board 21) of the LCD control circuit board 20 on which the external connector 43 is provided is the surface positioned on the side opposite to the liquid crystal display device 10, and is exposed to the outside. Accordingly, the external connector 43 is provided in the state in which the external connector 43 is exposed to the outside, and thus, it is possible to easily connect the external connector 43 to the external circuit.

Moreover, in the vehicle instrument device 1 of the present embodiment, the signal cable 71 which transmits the signals required for the operation of the liquid crystal display unit 30 and the power cable 73 which supplies power are connected to the external connector 43 on the outer surface of the LCD control circuit board 20. Accordingly, it is possible to easily perform connection of each cable.

In addition, the present invention is not limited to the above-described embodiment, and modifications, improvements, or the like may be appropriately performed thereon. Moreover, the material, the shape, the dimension, the number, the disposition, or the like of each component in the above-described embodiment may be arbitrary as long as the present invention is achieved, and are not limited.

In the above-described embodiment, the liquid crystal display device 10 and the LCD control circuit board 20 are described as examples. However, for example, it is possible to use other display devices and display control circuit boards such as an organic EL display device and an organic EL display control circuit board.

Here, the characteristics of the above-described embodiment of the vehicle instrument device according to the present invention are briefly defined and listed as the following [1] to [4].

[1] The vehicle instrument device (1) in which the pointer-type instrument (50) and the display device (liquid crystal display device 10) are arranged alongside each other, in which the display control circuit board (LCD control circuit board 20) for controlling the operation of the display device (liquid crystal display device 10) is formed as a separate member from the pointer control circuit board (60) for controlling the operation of the pointer-type instrument (50), has a dimension in the front view substantially the same as the dimension of the liquid crystal display device (liquid crystal display device 10) in the front view, and is attached to the rear surface of the liquid crystal display device (liquid crystal display device 10), and the liquid crystal display device (liquid crystal display device 10), which is integrated with the display control circuit board (LCD control circuit board 20) to serve as the display unit (liquid crystal display unit 30), is arranged alongside of the pointer-type instrument (50).

[2] In the vehicle instrument device (1) described in [1], the control circuit board (LCD control circuit board 20) includes the external connector (43) provided in an outer surface on an opposite side of the display device (liquid crystal display device 10) to allow a connection with an external circuit.

[3] In the vehicle instrument device (1) described in [2], the external connector (43) is connectable with, as the external circuit, the signal cable (71) which transmits the signal required for the operation of the display unit (liquid crystal display unit 30) and the power cable (73) which supplies power.

[4] In the vehicle instrument device (1) described in any one of [1] to [3], the display device is the liquid crystal display device (10), and the display control circuit board is the LCD control circuit board (20).

According to a vehicle instrument device of the present invention, in a vehicle instrument device in which a pointer-type instrument and a display device are arranged alongside each other, excessive quality in a pointer control circuit board for controlling the operation of the pointer-type instrument is prevented, and it is possible to reduce the cost.

What is claimed is:
1. A vehicle instrument device to be disposed on a vehicle dashboard comprising:
a housing;
a display device accommodated in the housing;

a display control circuit board which is accommodated in the housing, which is detachably attached to a rear surface of the display device, which has a dimension in a front view substantially the same as a dimension of the display device in a front view, and which controls an operation of the display device; and an instrument control circuit board which is a separate member from the display control circuit board and which controls display except for display of the display device, wherein the display device, which is integrated with the display control circuit board to serve as a display unit, is accommodated in the housing together with the instrument control circuit board.

2. The vehicle instrument device according to claim 1, wherein the display control circuit board has a multilayer structure of which a number of layers is larger than that of the instrument control circuit board.

3. The vehicle instrument device according to claim 1, wherein the display device is a liquid crystal display device, and wherein the display control circuit board is an LCD control circuit board.

4. A vehicle instrument device to be disposed on a vehicle dashboard comprising:

a housing;

a pointer-type instrument accommodated in the housing;

a display device which is arranged alongside of the pointer-type instrument in the housing;

a display control circuit board which controls an operation of the display device, which has a dimension in a front view substantially the same as a dimension of the display device in a front view, which is accommodated in the housing and which is detachably attached to a rear surface of the display device; and a pointer control circuit board accommodated in the housing and which is a separate member from the display control circuit board and which controls an operation of the pointer-type instrument, wherein the display device, which is integrated with the display control circuit board to serve as a display unit, is arranged alongside of the pointer-type instrument in the housing.

5. The vehicle instrument device according to claim 4, wherein the display control circuit board comprises an external connector provided in an outer surface on an opposite side of the display device to allow a connection with an external circuit.

6. The vehicle instrument device according to claim 5, wherein the external connector is connectable with, as the external circuit, a signal cable which transmits a signal required for the operation of the display unit and a power cable which supplies power.

7. The vehicle instrument device according to claim 4, wherein the display device is a liquid crystal display device, and wherein the display control circuit board is an LCD control circuit board.

* * * * *